(12) United States Patent
Napier et al.

(10) Patent No.: US 12,000,013 B2
(45) Date of Patent: Jun. 4, 2024

(54) CAUSTIC CONVERSION PROCESS

(71) Applicants: LITHIUM AUSTRALIA NL, West Perth (AU); AUSTRALIAN NUCLEAR SCIENCE AND TECHNOLOGY ORGANISATION, Lucas Heights (AU)

(72) Inventors: Andrew Napier, West Perth (AU); Christopher Griffith, Luca Heights (AU)

(73) Assignees: Australian Nuclear Science And Technology Organisation, Lucas Heights (AU); Lithium Australia Limited, Kew (AU)

( * ) Notice: Subject to any disclaimer, the term of this patent is extended or adjusted under 35 U.S.C. 154(b) by 675 days.

(21) Appl. No.: 17/262,449

(22) PCT Filed: Jul. 24, 2019

(86) PCT No.: PCT/AU2019/050773
§ 371 (c)(1),
(2) Date: Jan. 22, 2021

(87) PCT Pub. No.: WO2020/019026
PCT Pub. Date: Jan. 30, 2020

(65) Prior Publication Data
US 2021/0180155 A1    Jun. 17, 2021

(30) Foreign Application Priority Data
Jul. 24, 2018 (AU) ................................. 2018902680

(51) Int. Cl.
*C22B 26/12* (2006.01)
*C22B 3/08* (2006.01)
(Continued)

(52) U.S. Cl.
CPC ............... *C22B 26/12* (2013.01); *C22B 3/08* (2013.01); *C22B 3/10* (2013.01); *C22B 3/12* (2013.01); *C22B 3/22* (2013.01); *C22B 3/44* (2013.01)

(58) Field of Classification Search
CPC .. C22B 26/12; C22B 3/08; C22B 3/10; C22B 3/12; C22B 3/22; C22B 3/44; C22B 3/06;
(Continued)

(56) References Cited

U.S. PATENT DOCUMENTS 2,413,644 A * 12/1946 Nicholson ............... C22B 26/12
423/641
3,007,770 A * 11/1961 Kawecki ................. C22B 26/12
423/551
(Continued)

FOREIGN PATENT DOCUMENTS

CN    107986301 A      5/2018
KR    101201479    * 11/2012 ............. C22B 26/20
(Continued)

OTHER PUBLICATIONS

English translation of KR101201479 description (Year: 2012).*
(Continued)

*Primary Examiner* — Anthony J Zimmer
*Assistant Examiner* — Zachary John Baum
(74) *Attorney, Agent, or Firm* — Harness, Dickey & Pierce, P.L.C.

(57) ABSTRACT

The disclosure relates to processes for extracting lithium from an uncalcined lithium-bearing silicate and recovering a lithium salt therefrom. A slurry of the uncalcined lithium-bearing silicate and a caustic solution is heated in an autoclave to provide a Li-rich sodalite phase. The Li-rich sodalite phase is leached with a dilute acid to produce a lithium-rich pregnant liquor. Various subsequent processes to treat the lithium-rich pregnant liquor to recover a lithium salt, such as lithium phosphate, lithium carbonate, lithium sulphate or lithium hydroxide, are described.

19 Claims, 1 Drawing Sheet

(51) Int. Cl.
*C22B 3/10* (2006.01)
*C22B 3/12* (2006.01)
*C22B 3/22* (2006.01)
*C22B 3/44* (2006.01)

(58) Field of Classification Search
CPC .... C22B 3/20; C22B 3/18; C22B 3/42; C22B 1/00; C22B 1/005; C22B 1/02; Y02P 10/20
See application file for complete search history.

(56) References Cited

U.S. PATENT DOCUMENTS

| | | |
|---|---|---|
| 3,112,170 A | 11/1963 | Archambault et al. |
| 4,588,566 A | 5/1986 | Kluksdahl |
| 2006/0171869 A1* | 8/2006 | Anovitz .................. C01D 15/08 423/179.5 |
| 2013/0064743 A1* | 3/2013 | Laurin .................... C22B 19/24 423/101 |

FOREIGN PATENT DOCUMENTS

| | | |
|---|---|---|
| WO | WO-2007103083 A2 | 9/2007 |
| WO | WO-2018023159 A1 | 2/2018 |

OTHER PUBLICATIONS

Office Action for corresponding Chinese patent application No. 201980049651.0 dated Mar. 18, 2022 with English translation, 18 pages.

Extended European Search Report for corresponding European patent application No. 19840861.9 dated Mar. 28, 2022, 10 pages.

International Search Report and Written Opinion of the International Searching Authority, issued in PCT/AU2019/050773, dated Jan. 30, 2020; ISA/AU.

International Preliminary Report on Patentability, issued in PCT/AU2019/050773, dated Jun. 5, 2020; ISA/AU.

* cited by examiner

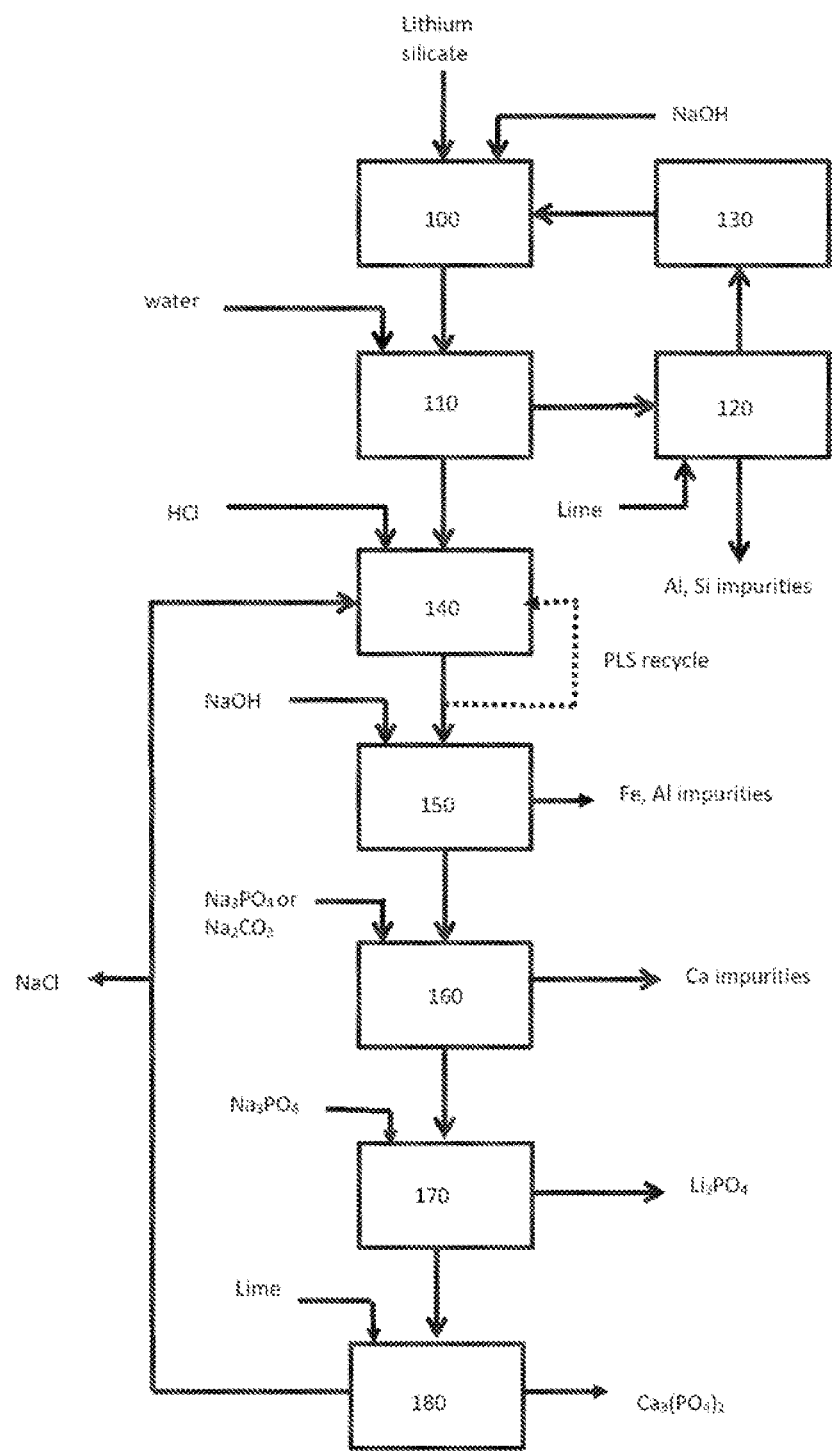

CAUSTIC CONVERSION PROCESS

CROSS-REFERENCE TO RELATED APPLICATIONS

This application is a 371 U.S. National Phase of International Application No. PCT/AU2019/050773, filed Jul. 24, 2019, which claims priority to Australian Patent Application No. 2018902680, filed Jul. 24, 2018. The entire disclosures of the above applications are incorporated herein by reference.

TECHNICAL FIELD

The present disclosure relates to a process for recovering lithium from lithium-bearing materials. In particular, the present disclosure relates to a process for recovering lithium phosphate, lithium carbonate or lithium hydroxide from lithium-bearing silicates.

BACKGROUND

Global supply of lithium is currently sourced from brines or hard rock deposits.

In the former, lithium is concentrated as soluble salts by solar evaporation. Lithium produced from brines is generally of a low grade and, while the capital input for brine production is high, operating costs are low.

In the case of hard rock deposits, conventional mining and beneficiation techniques are used to produce high grade alpha-spodumene (α-spodumene) concentrate. It is possible to obtain lithium chemicals of technical, battery grade (99.5%) or high-purity (>99.9%) lithium carbonate from various air roasting and lime roasting processes.

The air roasting method involves firstly decrepitation (at >1000° C.) to convert α-spodumene to the more reactive β-polymorph, followed by sulphation baking using sulfuric acid at 250° C. then water leaching of the acid bake residue at 90° C. to extract lithium into solution. This approach is largely accepted as the 'conventional' method for extracting lithium from spodumene. The lime roasting process, on the other hand, relies on roasting spodumene and lime at >1000° C. before water leaching the roasted material ('clinker') to extract lithium into solution. Other routes used to extract lithium from α-spodumene via pressure leaching with soda ash or chlorination roasting have also been proposed.

All of these processes involve an energy intensive, up-front, high temperature roasting step (i.e. calcining). The high energy cost associated with roasting (calcining) low-grade lithium concentrates has proven challenging.

There is therefore a need for alternative or improved processes to recover lithium from silicate materials, which avoids energy intensive processing steps, such as roasting (calcining).

It is to be understood that, if any prior art publication is referred to herein, such reference does not constitute an admission that the publication forms a part of the common general knowledge in the art, in Australia or any other country.

SUMMARY

The present disclosure provides a process for extracting lithium values from a lithium-bearing material, in particular from lithium-bearing silicates such as spodumene in the absence of a preliminary roasting step to convert α-spodumene to β-spodumene The present disclosure also provides a process for recovering lithium values as lithium carbonate or lithium phosphate from a lithium-bearing material, in particular a lithium-bearing silicate.

According to a first aspect of the disclosure, there is provided a process for extracting lithium from an uncalcined lithium-bearing silicate comprising the steps of:
a) heating a slurry of the uncalcined lithium-bearing silicate and a caustic solution in an autoclave to produce a Li-rich sodalite phase; and
b) leaching the Li-rich sodalite phase with a dilute acid to produce a lithium-rich pregnant liquor.

According to a second aspect of the disclosure, there is provided a process for recovering a lithium salt from an uncalcined lithium-bearing silicate comprising the steps of:
a) heating a slurry of the uncalcined lithium-bearing silicate and a caustic solution in an autoclave to produce a Li-rich sodalite phase;
b) leaching the Li-rich sodalite phase with a dilute acid to produce a lithium-rich pregnant liquor; and,
c) treating said liquor to recover the lithium salt.

In one embodiment, the lithium salt may be lithium carbonate, lithium hydroxide, lithium phosphate or lithium sulfate.

In one embodiment, the slurry may have a solids content ≤25 wt %.

In another embodiment, the caustic solution comprises from 30%-60% w/w NaOH. In an alternative embodiment, the caustic solution comprises from 30%-60% w/w KOH.

In one embodiment, the slurry is heated to a temperature from 200° C. to 350° C. in the autoclave, in particular 250° C. to 290° C. The heating step may be performed for a period from 1 to 6 hours, in particular 2-4 hours.

In various embodiments, after heating said slurry to produce a Li-rich sodalite phase, the process further comprises diluting said slurry with water at elevated temperature, in particular ≥80° C. The slurry may be diluted to 10-30% w/w NaOH or 10-30% w/w KOH. The Li-rich sodalite phase may be subsequently separated from the diluted slurry. It will be appreciated that the separated Li-rich sodalite phase may be washed one or more times to remove residual diluted caustic solution.

In one embodiment, after separating the Li-rich sodalite phase from the diluted slurry, the separated diluted caustic solution may be treated with lime slurry to produce insoluble calcium aluminates and calcium silicates and regenerate caustic solution for recycling to step a). The lime slurry may be 5-50 wt % lime, in particular 30 wt % lime. The insoluble calcium aluminates and calcium silicates may be subsequently separated from the slurry.

In another embodiment, one or more of the washings may be treated with lime slurry to produce insoluble calcium aluminates and calcium silicates. The lime slurry may be 5-50 wt % lime, in particular 30 wt % lime. The insoluble calcium aluminates and calcium silicates may be subsequently separated from the slurry.

In another embodiment, the separated diluted caustic solution and the one or more washings may be combined and treated with lime slurry to produce insoluble calcium aluminates and calcium silicates. The lime slurry may be 5-50 wt % lime, in particular 30 wt % lime. The insoluble calcium aluminates and calcium silicates may be subsequently separated from the slurry.

In some embodiments, the separated and/or combined caustic liquors from which the insoluble calcium aluminates and calcium silicates have been separated may be concentrated and recycled for use as the caustic solution in step a) of the process. In some embodiments, the concentrated caustic liquors may comprise 30-60 wt % NaOH or KOH, in particular 30-40 wt % NaOH or KOH, and from 0.1-4 g/L Li.

Increasing the caustic concentration of said caustic liquors may comprise evaporating the remaining liquids for a period of time sufficient to increase the caustic concentration thereof up to the saturation limit of the caustic solution employed. In some embodiments, the evaporation may be performed at atmospheric pressure or reduced pressure. In some embodiments, evaporation may be performed at a temperature between 80-150° C.

In various embodiments, leaching the Li-rich sodalite phase with dilute acid is performed at a temperature from 20-90° C., in particular 60-80° C. The leaching step may be performed for a period from 30 minutes to 24 hours, in particular 6 to 12 hours.

In one embodiment the dilute acid comprises HCl or $H_2SO_4$. The dilute acid may be pH 2-6, in particular pH 4.

In one embodiment, a slurry of the Li-rich sodalite phase and the dilute acid has a solids content ≤50 wt %.

In various embodiments, lithium extraction from the Li-rich sodalite phase into the lithium-rich pregnant liquor may be >90%, in particular >95%. In some embodiments, the lithium-rich pregnant liquor comprises from 5-25 g/L Li, in particular from 10-15 g/L Li. In some embodiments, at least a portion of the lithium-rich pregnant liquor may be recycled to slurry the Li-rich sodalite phase in step b) to increase the Li content of the resulting lithium-rich pregnant liquor.

In various embodiments, prior to treating the lithium-rich pregnant liquor to recover the lithium salt, the process further comprises removing impurities from the lithium-rich pregnant liquor. In some embodiments, the step of removing impurities from the lithium-rich pregnant liquor comprises increasing a pH of the lithium-rich pregnant liquor to pH >10 by adding an alkali thereto. Suitable alkalis include, but are not limited to, sodium hydroxide, potassium hydroxide, lithium hydroxide, lime, ammonia, or a combination of two or more of the foregoing. It will be appreciated that the impurities may be separated by filtration.

In some embodiments, after removing impurities from the lithium-rich pregnant liquor, the process may further comprise softening said liquor by decreasing the calcium content thereof to less than 25 ppm. In some embodiments, the softening step may comprise adding potassium carbonate or potassium phosphate to the lithium-bearing solution to produce calcium precipitates comprising calcium carbonate or apatite. In other embodiments, the softening step may comprise adding alkali metal phosphates, such as sodium phosphate, to said liquor to produce calcium precipitates comprising apatite.

In one embodiment, treating the lithium-rich pregnant liquor to recover lithium carbonate comprises contacting the lithium-rich pregnant liquor with carbon dioxide to produce lithium carbonate solids and a barren lithium solution.

In an alternative embodiment, treating the lithium-rich pregnant liquor to recover lithium carbonate comprises adding a carbonate salt to the lithium-rich pregnant liquor to produce lithium carbonate solids and a barren lithium solution. Suitable carbonate salts include, but are not limited to, ammonium carbonate, sodium carbonate, potassium carbonate, or a mixture thereof.

Said lithium carbonate solids may be separated from the barren lithium solution. In one embodiment the barren lithium solution may be recycled to the leaching step.

In another embodiment, treating the lithium-rich pregnant liquor to recover lithium phosphate comprises adding phosphate to the lithium-rich pregnant liquor to produce lithium phosphate solids and a barren solution. Phosphate may be added as a solid or an aqueous solution. The phosphate may be selected from the group comprising phosphoric acid, potassium, phosphate, sodium phosphate, or a combination thereof.

In some embodiments, the process may further comprise recovering phosphate from the separated solution as tri-calcium phosphate and/or apatite. Said tri-calcium phosphate and/or apatite may be separated from the softened liquor. In these embodiments, recovering phosphate from the separated liquor as tri-calcium phosphate and/or apatite may comprise adding calcium hydroxide to said separated solution.

In another embodiment, wherein the dilute acid solution comprises sulphuric acid, treating the lithium-rich pregnant liquor to recover lithium sulfate comprises evaporating the lithium-rich pregnant liquor to recover lithium sulfate.

In another embodiment, treating the lithium-rich pregnant liquor to recover lithium hydroxide comprises:
i) adding a sodium hydroxide solution to the lithium-rich pregnant liquor to increase a pH thereof to pH >10:
ii) cooling said PLS from step i) to <10° C. to crystallise Glauber salt therefrom;
iii) separating Glauber salt from said lithium-rich pregnant liquor from step ii); and
iv) concentrating said lithium-rich pregnant liquor from step iii) to 50-90% of its volume by evaporation and allowing lithium hydroxide solids to crystallise from said concentrated lithium-rich pregnant liquor.

In some embodiments, the evaporation may be performed at atmospheric pressure or reduced pressure. In some embodiments, the evaporation may be performed at a temperature from 80° C. to 150° C.

The lithium hydroxide solids may be separated from said concentrated lithium-rich pregnant liquor to leave a barren lithium solution. In one embodiment, the barren lithium solution may be recycled to step i) or the step of removing impurities.

According to a third aspect of the disclosure, there is provided a process for recovering lithium hydroxide from a lithium-bearing silicate comprising the steps of:
a) heating a slurry of the lithium-bearing silicate and a caustic solution in an autoclave to produce a Li-rich sodalite phase;
b) leaching the Li-rich sodalite phase with a dilute sulfuric acid solution to produce a lithium-rich pregnant liquor;
c) treating the lithium-rich pregnant liquor to remove impurities:
d) concentrating the treated lithium-rich pregnant liquor to increase the concentration of lithium and sodium sulfate;
e) removing sodium sulfate by crystallisation at low temperature; and
f) recovering lithium hydroxide by crystallisation.

According to a fourth aspect of the disclosure there is provided a process for recovering lithium phosphate from a lithium-bearing silicate comprising the steps of:
a) heating a slurry of the lithium-bearing silicate and a caustic solution in an autoclave to produce a Li-rich sodalite phate;
b) leaching the Li-rich sodalite phase with an acid to produce a lithium-rich pregnant liquor;
c) treating the lithium-rich pregnant liquor to remove impurities; and d) adding phosphate to the lithium-rich pregnant liquor to produce lithium phosphate solids and a phosphate-free barren solution.

In one embodiment, the process further comprises separating the lithium phosphate solids from the phosphate-free barren solution, adding an alkali metal hydroxide to the phosphate-free barren solution and recycling the phosphate free barren solution to step b).

BRIEF DESCRIPTION OF DRAWINGS

Notwithstanding any other forms which may fall within the scope of the process as set forth in the Summary, specific embodiments will now be described, by way of example only, with reference to the accompanying FIGURES in which:

FIG. 1 is a process flow sheet depicting a process for recovery of lithium phosphate from lithium-bearing silicates.

DESCRIPTION OF EMBODIMENTS

The present invention is described in the following various non-limiting embodiments, which relate to a process for recovering lithium values, in particular lithium carbonate, from lithium-bearing materials, in particular uncalcined lithium-bearing silicates.

General Terms

Throughout this specification, unless specifically stated otherwise or the context requires otherwise, reference to a single step, composition of matter, group of steps or group of compositions of matter shall be taken to encompass one and a plurality (i.e. one or more) of those steps, compositions of matter, groups of steps or groups of compositions of matter. Thus, as used herein, the singular forms "a", "an" and "the" include plural aspects unless the context clearly dictates otherwise. For example, reference to "a" includes a single as well as two or more; reference to "an" includes a single as well as two or more; reference to "the" includes a single as well as two or more and so forth.

Each example of the present disclosure described herein is to be applied mutatis mutandis to each and every other example unless specifically stated otherwise. The present disclosure is not to be limited in scope by the specific examples described herein, which are intended for the purpose of exemplification only. Functionally-equivalent products, compositions and methods are clearly within the scope of the disclosure as described herein.

The term "and/or", e.g., "X and/or Y" shall be understood to mean either "X and Y" or "X or Y" and shall be taken to provide explicit support for both meanings or for either meaning.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

It will be clearly understood that, although a number of prior art publications are referred to herein, this reference does not constitute an admission that any of these documents forms part of the common general knowledge in the art, in Australia or in any other country.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the present specification, including definitions, will control. In addition, the materials, methods, and examples are illustrative only and not intended to be limiting.

Specific Terms

The term "lithium bearing silicate" as used herein refers to a concentrate, ore, or tailings derived from one or more silicate minerals containing lithium values. Exemplary lithium bearing silicates include, but are not limited to, jadarite, spodumene and other pyroxenes, trilithionite, petalite and other lithium-bearing silicates from the nepheline group of minerals, holmquistite and other lithium-bearing silicates from the amphibole group of minerals, lepidolite, zinwaldite, elbaite and other tourmalines, chlorites, smectites, lithium-containing micas, and lithium-containing clays. The process described herein in particularly suitable for recovery of lithium from α-spodumene or petalite. Several metals, such as Mn, Rb and Cs, and other minerals such as quartz, albite, feldspar, topaz and beryl may also be associated with these lithium minerals. Accordingly, the term "lithium-bearing silicate" encompasses high grade ores and concentrates as well as medium to low grade ores, concentrates and blends thereof.

Calcination is a thermal treatment process in which solids are heated to high temperatures (i.e. >500° C.) in in the absence of, or controlled supply of, air or oxygen, generally resulting in the decomposition of the solids to remove carbon dioxide, water of crystallization or volatiles, or to effect a phase transformation, such as the conversion of α-spodumene to β-spodumene. Such thermal treatment processes may be carried out in furnaces or reactors, such as shaft furnaces, rotary kilns, multiple hearth furnaces and fluidized bed reactors. The term "uncalcined" as used herein refers to solids which have not undergone calcination. In particular, when used with respect to lithium silicates, the term "uncalcined lithium silicate" refers to a lithium silicate which has not undergone calcination or any other thermal treatment which is capable of effecting a phase transformation.

A reference to 'g/kg' or 'kg/t' throughout the specification refers to the mass of a substance per kilogram or tonne, respectively, of the lithium-bearing material.

The term "Li-rich sodalite phase" refers to an aluminosilicate phase with comparable crystal structure to that of sodalite (OH form) of general formula $M_8(Al_6Si_6O_{24})(OH)_2$ in which the cations ('M') and hydroxide groups (OH) reside within aluminosilicate cages of the unit cell. A reference to "Li-rich sodalite phase" as used herein refers to a phase in which Li at least partially substitutes for Na or K in the aluminosilicate cages.

The term 'apatite' as used herein refers to one or more calcium phosphate compounds of general formula $Ca_5(PO_4)_3(F, Cl, OH)$ (repeating unit) and may include hydroxyapatite, fluorapatite, chlorapaite or admixtures thereof.

Process for Extracting Lithium Values

The process for extracting lithium values from lithium-bearing materials, as described herein, is particularly suited to lithium-bearing silicates, in particular uncalcined lithium-bearing silicates, such as α-spodumene and petalite. Lithium extraction achieved by the process may be >85%, >90%, >95%, or even >98%.

Prior to undergoing the processes described herein, the uncalcined lithium-bearing silicate may be ground and milled to $P_{100}$<160 μm. In certain embodiments the uncalcined lithium-bearing silicate may have a particle size with $P_{80}$ in a range of 20-160 μm, 40-100 μm, or in the range of 40-50 μm. The uncalcined lithium-bearing silicate may be ground and milled to the desired particle size by conventional techniques well known in the art in a dry milling process or a wet milling process.

Referring to the accompanying FIGURE, lithium values may be extracted from an uncalcined lithium-bearing silicate by heating (100) a slurry of the uncalcined lithium-bearing silicate and a caustic solution in an autoclave to produce a Li-rich sodalite phase.

The slurry may have a solids content ≤25 wt %, in particular 20 wt %.

The term 'caustic solution' as used herein generally refers to aqueous sodium hydroxide solutions but may also comprise aqueous hydroxide solutions having one or more types of counter-cations including, but not limited to, alkali metals such as potassium, lithium, or combinations thereof. The caustic solution may be a sodium hydroxide (NaOH) solution or a potassium hydroxide (KOH) solution with a concentration in a range of 30-60 wt %, in particular 30-40 wt %. It will be appreciated that the caustic solution may be a solution of sodium hydroxide and potassium hydroxide with a total alkali concentration in a range of 30-60 wt %, in particular 30-40 wt %

The slurry may be heated for a period of time sufficient to convert the uncalcined lithium-bearing silicate to the Li-rich sodalite phase. The time required for the extraction depends upon the mineralogy and particle size of the uncalcined lithium-bearing silicate, the concentration of the caustic solution, the solids density of the slurry, and the temperature conditions.

It will be appreciated by those skilled in the art that, other things being equal, the higher the temperature, the shorter the reaction time to achieve the desired level of extraction.

Generally, the slurry is heated to a temperature from 200° C. to 350° C., in particular 250° C. to 290° C. in the autoclave. The heating step may be performed for a period from 1 to 6 hours, in particular 2 hours.

The slurry may be stirred or mechanically agitated during the heating step with an impeller or an alternative agitator as will be well known to those skilled in the art.

The heated slurry may then be diluted (110) with water to 10-30% w/w with respect to caustic solution.

The diluted slurry may then undergo a conventional separation technique to separate the Li-rich sodalite phase from the diluted slurry. Suitable conventional separation techniques include, but are not limited to, filtration, gravity separation, centrifugation and so forth. It will be appreciated by those skilled in the art that additives such as clarifying agents and/or thickeners may be mixed into the diluted slurry prior to separating solids from liquids to facilitate efficient separation thereof It will be appreciated that the Li-rich sodalite phase may undergo one or more washings during separation.

The liquids remaining after separation of the Li-rich sodalite phase (i.e. the primary filtrate (PF)) may be combined with the one or more caustic wash liquors. The combined liquors contain soluble aluminium and silicon which may be removed as calcium silicates and calcium aluminates when the combined liquors are treated with lime, thereby regenerating a caustic solution. The combined liquors may be treated with a stoichiometric amount of lime slurry (120) at elevated temperatures of between 60° C. to 80° C. to produce calcium silicates and aluminium silicates solids.

The solids may be separated by conventional separation techniques. Suitable conventional separation techniques include, but are not limited to, filtration, gravity separation, centrifugation and so forth. It will be appreciated by those skilled in the art that additives such as clarifying agents and/or thickeners may be mixed into the diluted slurry prior to separating solids from liquids to facilitate efficient separation thereof. It will be appreciated that the calcium aluminates and calcium silicates may undergo one or more washings during separation.

The inventors have found that in the heating step (100) of the process as described herein from 70% to 95% Li deports to the Li-rich sodalite phase thereby providing an efficient separation of Li from the caustic solution, K, Si and other impurities which remain soluble in the slurry. Additionally, subsequent removal of silicates from the Li-rich sodalite phase during the one or more washings also provides an excellent separation of Li from any Si which is solubilised during the heating step.

About 5% to 30% Li remains in the separated liquids, optionally combined with the one or more caustic wash liquors. The combined liquids may be treated with lime as described above to precipitate calcium aluminates and calcium silicates. The caustic concentration of the treated combined liquids may be from 5-30% w/w. Advantageously, the separated treated combined liquids may be concentrated (130) to increase the caustic concentration of the combined liquids and recycled for use as the caustic solution in the heating step (100) of the process. In this way, Li losses in the process are minimised and caustic solution is conserved within the process. In some embodiments, the caustic concentration of the combined liquids may be increased to 30-60 wt % NaOH or KOH, in particular 30-40 wt % NaOH or KOH. The Li content of the concentrated combined liquids may be 1-4 g/L Li.

The caustic concentration of the combined liquids may be increased by evaporating the combined liquids for a period of time sufficient to increase the caustic concentration to 30-60 wt %. In some embodiments, the combined liquids may be evaporated at atmospheric pressure at a temperature between 80-150° C.

It will be appreciated by those skilled in the art that in some embodiments, the primary filtrate alone may be treated as described above to remove soluble aluminium and silicon as calcium silicates and calcium aluminates. The caustic concentration of the treated primary filtrate may then be increased as described above and the concentrated primary filtrate or a portion thereof may be recycled for use as the caustic solution in the heating step (100) of the process.

Alternatively, the one or more caustic wash liquors may be treated as described above to remove soluble aluminium and silicon as calcium silicates and calcium aluminates. The caustic concentration of the treated caustic wash liquors may then be increased as described above and subsequently recycled for use as the caustic solution in the heating step (100) of the process.

The treated primary filtrate, or a portion thereof, may be optionally combined with the treated caustic wash liquors before recycling for use as the caustic solution in the heating step (100) of the process.

Extraction of Li from the Li-rich sodalite phase can be achieved by leaching the Li-rich sodalite phase (140) under relatively mild, acidic conditions to produce a lithium-rich pregnant liquor containing high tenors of Li (up to 30 g/L) and relatively low tenors of major impurities such as Al, Fe and Si. The inventors opine that the mechanism of Li extraction from the Li-rich sodalite phase appears to be via an ion exchange mechanism (Li/H$^+$).

In various embodiments, leaching (140) the Li-rich sodalite phase with dilute acid is performed at a temperature from 20-80° C. The leaching step may be performed for a period from 1 to 24 hours, in particular 2-8 hours.

In one embodiment the dilute acid solution comprises a strong acid such as HCl, HNO$_3$ H$_2$SO$_4$, or a combination thereof. The dilute acid solution may be pH 2-6, in particular pH 3-5.

In various embodiments, lithium extraction from the Li-rich sodalite phase into the lithium-rich pregnant liquor may be >90%, in particular >95%. In some embodiments, the lithium-rich pregnant liquor comprises from 5-10 g/L Li. Optionally, at least a portion of the lithium-rich pregnant liquor may be recycled to slurry the Li-rich sodalite phase to increase lithium content in the resulting lithium-rich pregnant liquor.

The processes described herein may be carried out in either a batch mode or a continuous mode. The particular choice of operation will depend upon a residence time necessary to extract the desired amount of lithium.

Process for Recovering a Lithium Salt from Lithium-Bearing Silicates

After extracting the lithium values from the lithium-bearing material as described in the foregoing paragraphs, lithium values may be subsequently recovered from the lithium pregnant solution as lithium salts, including but not limited to lithium carbonate, lithium hydroxide, lithium phosphate, or lithium sulfate.

It will be appreciated by the person skilled in the field, that one or more impurities may be co-dissolved with lithium in the lithium-rich pregnant liquor. The term "impurities" as used herein refers to a metal value, other than lithium, contained in the Li-rich sodalite phase which is capable of dissolving under mildly acidic conditions. Examples of typical metal values, other than lithium, include but are not limited to K, Na, Cs, Rb, Si, Al and Fe.

The lithium-rich pregnant liquor may be readily purified by adding (150) a suitable base such as caustic (i.e. sodium hydroxide and/or sodium carbonate), potassium hydroxide or lithium hydroxide with a chloride-based liquor or lime, caustic, potassium hydroxide or lithium hydroxide with a sulfate-based liquor prior to recovering the desired lithium salt. Resulting precipitates of the impurities may be removed by a conventional separation technique, as will be well understood by persons skilled in the art. Calcium is frequently present in undesirable concentrations in lithium-bearing solutions, in particular pregnant process liquors, because the pregnant process liquor may have been previously treated with an excess of lime to precipitate metal impurities such as calcium aluminates and calcium silicates out of solutions, as described above. It is conventional practice to subsequently deplete (or 'soften') the pregnant process liquor of calcium by adding sodium carbonate to precipitate calcium carbonate, thereby lowering the calcium content.

Some of the embodiments described in the present disclosure provide an alternative process for softening lithium-rich pregnant liquors to decrease calcium content thereof from approximately 500 ppm to less than 25 ppm, in particular less than 20 ppm.

After removal of impurities (150) from the lithium-rich pregnant liquor, the calcium content of the lithium-rich pregnant liquor may be decreased (160) by adding sodium carbonate thereto to produce calcium precipitates such as calcium carbonate, as well as magnesium carbonate. Sodium carbonate may be added to the lithium-rich pregnant liquor as a 20% w/w solution at a temperature from ambient to 90° C., in particular from 50° C. to 60° C. The amount of sodium carbonate added to the lithium-rich pregnant liquor may be sufficient to eliminate residual calcium content in said liquor or at least to reduce the calcium content in said liquor to less than 25 ppm, in particular 20 ppm.

Alternatively, the inventors have found that sodium phosphate may be added to the lithium-rich pregnant liquor to facilitate the softening step (160) and decrease calcium content by producing calcium phosphate.

Sodium phosphate may be added to the lithium-rich pregnant liquor as a 100 g/L Na$_3$PO$_4$ solution in one or more aliquots to greater than 100% stoichiometric addition (wrt apatite formation), in particular 200% to 500% stoichiometric addition (wrt apatite formation). Moreover, any fluoride in the lithium-rich pregnant solution may be precipitated as fluorapatite, thereby decreasing the fluoride concentration to less than 5 ppm. The inventors opine that the main phase produced during initial addition of potassium phosphate, is calcium phosphate and hydroxyapatite.

It will be appreciated that in embodiments where the lithium-rich pregnant solution has a high K content, the 'softening step' may be performed by adding potassium phosphate to the lithium-bearing solution instead of sodium phosphate in similar amounts as described above to produce calcium phosphate and fluorapatite (if fluoride is present in said liquor). Alternatively, another alkali metal phosphate may be employed in the softening step.

Referring to the accompanying FIGURE, the process as disclosed herein further comprises adding phosphate to the softened lithium-rich pregnant liquor to precipitate lithium phosphate (170).

Phosphate may be added as an aqueous solution. The phosphate may be selected from the group comprising phosphoric acid, potassium phosphate, sodium phosphate, or a combination thereof. It will be appreciated that the concentration of the aqueous phosphate solution will be practically limited by its solubility. For example, the concentration of an aqueous potassium phosphate solution may be from 100 g/L to 800 g/L. Phosphate may be added to the softened lithium-rich pregnant liquor in stoichiometric excess to ensure that soluble lithium remaining in solution is less than 100 mg/L and residual P remaining in solution is greater than 500 mg/L, in particular 500 mg/L to 3000 mg/L.

In embodiments wherein the phosphate solution comprises phosphoric acid, hydroxide ions (e.g. KOH) may be concurrently added to the softened lithium-rich pregnant liquor in an amount sufficient to maintain the pH of said solution above a threshold pH where lithium phosphate may re-dissolve and raise the soluble lithium in solution to greater than 100 mg/L Adding phosphate to the softened lithium-rich pregnant liquor to precipitate lithium phosphate may be performed at a temperature ranging from 50° C. to below boiling point of the solution, in particular greater than 90° C.

Lithium phosphate precipitate may be separated from solution by conventional separation techniques and washed in several stages. Suitable separation techniques include, but are not limited to, filtration, gravity separation, centrifugation, decantation and so forth. The mother liquor and wash filtrates may be combined and may undergo a de-phosphorylation process (180) as described below.

The de-phosphorylation process (180) comprises adding calcium hydroxide to the filtrate or the supernatant to produce tri-calcium phosphate and/or apatite precipitate. The calcium hydroxide may be selected from a group comprising hydrated lime, quicklime, slaked lime and mixtures thereof.

The tri-calcium phosphate and/or apatite precipitate may be separated from the resulting liquor by conventional separation techniques. Suitable separation techniques include, but are not limited to, filtration, gravity separation, centrifugation, decantation and so forth. After removal of excess phosphate, the barren lithium solution may be recycled back to step a) or step b) of the process to minimise lithium losses and/or optimise water balance.

In alternative embodiments, lithium carbonate may be recovered from the lithium-rich pregnant liquor by increasing a carbonate content of the lithium-rich pregnant liquor to a concentration in excess of the solubility limit of lithium carbonate. This may be readily achieved by adding a carbonate salt to the lithium-rich pregnant liquor to produce lithium carbonate solids and a barren lithium solution. Suitable carbonate salts include, but are not limited to, ammonium carbonate, sodium carbonate, potassium carbonate, or a mixture thereof.

Alternatively, lithium carbonate may be recovered from the lithium-rich pregnant liquor by contacting said lithium-rich pregnant liquor with carbon dioxide to produce lithium carbonate solids and a barren lithium solution. In some embodiments, said lithium-rich pregnant liquor is sparged with carbon dioxide at a steady rate. The temperature of said lithium-rich pregnant liquor may be in the range of 90° C.-100° C.

The resulting lithium carbonate solids may be separated from the resulting barren lithium solution by conventional separation techniques described in the preceding paragraphs. The barren lithium solution may be recycled back to step b) of the process to minimise lithium losses.

In other alternative embodiments, lithium sulfate may be recovered from the lithium-rich pregnant liquor by increasing a sulfate content of the lithium-rich pregnant liquor to a concentration in excess of the solubility lithium of lithium sulfate. The increased sulfate content may be achieved by evaporating the lithium-rich pregnant liquor. Evaporation of the lithium-rich liquor may be performed at atmospheric pressure or reduced pressure. Evaporation of the lithium-rich liquor may be performed at a temperature from 80° C. to 150° C.

The resulting lithium sulfate solids may be separated from the resulting barren lithium solution by conventional separation techniques described in the preceding paragraphs. The barren lithium solution may be recycled back to step b) of the process to minimise lithium losses.

Alternatively, lithium hydroxide may be recovered from the lithium-rich pregnant liquor by adding sodium hydroxide to the lithium-rich pregnant liquor to increase pH to greater than pH 10. The lithium-rich pregnant liquor may then be cooled to <10° C. to crystallise a Glauber salt therefrom. The Glauber salt may be separated from the resulting lithium-rich pregnant liquor by conventional separation techniques, such as filtration.

The primary filtrate may be concentrated to 50-90% of its volume by evaporation and lithium hydroxide solids are allowed to crystallise therefrom. Evaporation may be performed at atmospheric pressure or reduced pressure and at a temperature from 80° C. to 150° C.

The lithium hydroxide solids may be separated from the concentrated primary filtrate to leave a barren lithium solution. In one embodiment, the barren lithium solution may be recycled back to step a) and/or step b) of the process to minimise lithium losses.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A process for extracting lithium from an uncalcined lithium-bearing silicate comprising:
    a) heating a slurry of the uncalcined lithium-bearing silicate and a caustic solution in an autoclave to produce a Li-rich sodalite phase; and
    b) leaching the Li-rich sodalite phase with a dilute acid having a pH of 2-6 to produce a lithium-rich pregnant liquor.

2. The process according to claim 1, further comprising treating the lithium-rich pregnant liquor to recover a lithium salt from the lithium-rich pregnant liquor.

3. The process according to claim 1, wherein the slurry has a solids content ≤25 wt %.

4. The process according to claim 1, wherein the caustic solution comprises from 30%-60% w/w NaOH or 30-60 wt % KOH.

5. The process according to claim 1, wherein the slurry is heated to a temperature from 200° C. to 350° C. in the autoclave and for a period from 1 to 6 hours.

6. The process according to claim 1, wherein after heating said slurry to produce a Li-rich sodalite phase, the process further comprises diluting said slurry with water to 10-30% w/w NaOH or 10-30% w/w KOH.

7. The process according to claim 6, wherein the Li-rich sodalite phase is separated from the diluted slurry and the separated Li-rich sodalite phase is washed one or more times to remove residual diluted caustic solution.

8. The process according to claim 7, wherein the separated dilute caustic solution is treated with lime to produce insoluble calcium aluminates and calcium silicates.

9. The process according to claim 1, wherein leaching the Li-rich sodalite phase with dilute acid is performed at a temperature from 20-80° C. and for a period from 30 minutes to 24 hours.

10. The process according to claim 1, wherein the dilute acid comprises HCl or $H_2SO_4$.

11. The process according to claim 1, wherein a slurry of the Li-rich sodalite phase and dilute acid has a solids content ≤50 wt %.

12. The process according to claim 1, wherein the lithium-rich pregnant liquor comprises from 5-25 g/L Li.

13. The process according to claim 2, wherein the lithium salt comprises lithium carbonate, lithium hydroxide, lithium phosphate or lithium sulfate.

14. The process according to claim 2, wherein prior to treating the lithium-rich pregnant liquor to recover the lithium salt, the process further comprises removing impurities from the lithium-rich pregnant liquor.

15. The process according to claim 14, wherein the removing impurities from the lithium-rich pregnant liquor comprises increasing the pH of the lithium-rich pregnant liquor to pH >10 by adding a base thereto and separating precipitates containing the impurities by filtration.

16. The process according to claim 15, wherein after removing impurities from the lithium-rich pregnant liquor, the process further comprises softening said liquor by decreasing the calcium content thereof to less than 25 ppm.

17. The process according to claim 16, wherein the softening comprises adding alkali metal carbonate or alkali metal phosphate to the lithium-bearing solution to produce calcium precipitates comprising calcium carbonate or apatite and separating said calcium precipitates.

18. The process according to claim 13, wherein treating the lithium-rich pregnant liquor to recover lithium carbonate, lithium phosphate or lithium sulfate comprises:
   contacting the lithium-rich pregnant liquor with carbon dioxide or adding a carbonate salt to the lithium-rich pregnant liquor to produce lithium carbonate solids and a barren lithium solution; or
   adding a phosphate salt to the lithium-rich pregnant liquor to produce lithium phosphate solids and a barren lithium solution; or
   treating the lithium-rich pregnant liquor to recover lithium sulfate comprises evaporating the lithium-rich pregnant liquor to produce lithium sulfate solids and a barren lithium solution.

19. The process according to claim 18, wherein the barren lithium solution is separated and recycled.

* * * * *